(12) United States Patent
Robinson et al.

(10) Patent No.: US 10,745,860 B2
(45) Date of Patent: Aug. 18, 2020

(54) SYSTEM AND METHODS FOR REDUCING EDGE WICKING OF A PAPERBOARD COMPRISING FRUIT FIBER AND COMPOSITIONS PRODUCED THEREBY

(71) Applicant: The Coca-Cola Company, Atlanta, GA (US)

(72) Inventors: Kim W. Robinson, Atlanta, GA (US); Ronald Moffitt, Atlanta, GA (US); Peter R. Moss, Atlanta, GA (US); Simon Gainey, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 16/063,157

(22) PCT Filed: Dec. 16, 2016

(86) PCT No.: PCT/US2016/067171
§ 371 (c)(1),
(2) Date: Jun. 15, 2018

(87) PCT Pub. No.: WO2017/106646
PCT Pub. Date: Jun. 22, 2017

(65) Prior Publication Data
US 2019/0003119 A1 Jan. 3, 2019

Related U.S. Application Data

(60) Provisional application No. 62/268,171, filed on Dec. 16, 2015.

(51) Int. Cl.
| | |
|---|---|
| *D21H 21/16* | (2006.01) |
| *D21H 15/10* | (2006.01) |
| *B32B 27/08* | (2006.01) |
| *B32B 1/06* | (2006.01) |
| *B32B 27/10* | (2006.01) |
| *D21C 5/00* | (2006.01) |
| *D21C 9/02* | (2006.01) |
| *D21H 11/12* | (2006.01) |
| *D21H 17/11* | (2006.01) |
| *D21H 17/17* | (2006.01) |
| *D21H 17/62* | (2006.01) |
| *D21H 17/66* | (2006.01) |
| *D21H 17/00* | (2006.01) |
| *D21H 27/00* | (2006.01) |

(52) U.S. Cl.
CPC ............... *D21H 15/10* (2013.01); *B32B 1/06* (2013.01); *B32B 27/08* (2013.01); *B32B 27/10* (2013.01); *D21C 5/00* (2013.01); *D21C 9/02* (2013.01); *D21H 11/12* (2013.01); *D21H 17/11* (2013.01); *D21H 17/17* (2013.01); *D21H 17/62* (2013.01); *D21H 17/66* (2013.01); *D21H 17/73* (2013.01); *D21H 21/16* (2013.01); *D21H 27/004* (2013.01)

(58) Field of Classification Search
USPC .................................................. 162/148, 141
See application file for complete search history.

(56) References Cited

U.S. PATENT DOCUMENTS

| | | | |
|---|---|---|---|
| 4,144,122 A | 3/1979 | Emanuelsson et al. | |
| 4,783,239 A | 11/1988 | Thomas | |
| 5,759,704 A | 6/1998 | Horiuchi et al. | |
| 8,864,940 B2 * | 10/2014 | Moss ..................... | D21H 11/12 162/10 |
| 2012/0171495 A1 | 7/2012 | Masuda et al. | |
| 2015/0101773 A1 | 4/2015 | Moss et al. | |

FOREIGN PATENT DOCUMENTS

| | | |
|---|---|---|
| EP | 0376390 A1 | 7/1990 |
| WO | 2006033697 A1 | 3/2006 |
| WO | 2012175920 A2 | 12/2012 |
| WO | 2015003116 A2 | 1/2015 |

OTHER PUBLICATIONS

International Search Report and Written Opinion regarding PCT Application No. PCT/US2016/067171, dated Mar. 23, 2017, 8 pages.
Ladaniya, Milind. Citrus Fruit: Biology, Technology and Evaluation [online]. 1st edition. Academic Press, 2010 [retrieved on Feb. 9, 2017]. Retrieved from the Internet: >URL:https://books.google.com/books?id=v5hCqEvR9eEC&lpg=PP1&pg=PP1#v=onepage&q&f=false>.
Extended European Search Report regarding Europe Application No. 16776772.1, dated May 6, 2019, 7 pages.

* cited by examiner

*Primary Examiner* — Mark Halpern
(74) *Attorney, Agent, or Firm* — Dentons US LLP

(57) ABSTRACT

A composition including a first fiber derived from a first natural source, and a second fiber derived from a fruit, the second fiber being substantially free of surface active components. Surface active components may include oils, fatty acids, or other aliphatic and aromatic moieties that compromise edge wick performance. A process of manufacturing a paperboard product may include removing surface active components from fruit fiber to be included in manufacturing paper products to obtain a paper product with improved edge wicking properties.

9 Claims, 8 Drawing Sheets

SYSTEM AND METHODS FOR REDUCING EDGE WICKING OF A PAPERBOARD COMPRISING FRUIT FIBER AND COMPOSITIONS PRODUCED THEREBY

This application is a 371 of PCT/US16/67171 filed 16 Dec. 2016

RELATED APPLICATIONS

This application claims priority to U.S. Provisional Patent Application having Ser. No. 62/268,171 filed on Dec. 16, 2015; the contents of which are hereby incorporated by reference in their entirety.

FIELD OF THE INVENTION

The present invention relates to methods of producing paper materials including fruit fiber, and more specifically to methods of processing paper materials comprising fruit fiber useful in the manufacture of paper, including packaging, writing, and other papers. The present invention also relates to articles, such as paper and packaging, containing fruit fiber as a partial replacement for wood fiber.

BACKGROUND

Wood fiber has been used in the manufacture of paper and packaging since the mid 1800's. Although wood fiber continues to offer valued performance characteristics, its poor environmental profile has led to the search for alternative fibers to at least partially replace the wood fiber. Various non-wood fibers have been suggested, including sugar cane, bagasse, wheat and rice straws, bamboo, cotton stalks, banana leaves, fig leaves, reed, amur grass, and kenaf.

One potential source of non-wood fiber for use in paper materials is citrus fruit. Selected varieties of citrus fruit, including the sweet orange and the grapefruit, are processed commercially to provide juice and sections. About 45 to 60 percent of their weight remains post-processing, in the form of peel, rag, and seeds. The by-product volume is significant; Florida's citrus processing plants alone produce 5 million tons of wet citrus by-product annually. Citrus fruit therefore presents a potential non-wood fiber that could be useful in the manufacture of paper or packaging.

However, previous attempts to use citrus fiber in the production of paper products have resulted in materials with unacceptable properties for packaging commercial products. For example, paper or packaging materials including citrus fiber have historically exhibited levels of liquid uptake which result in a loss of packaging integrity or package failure. Liquid uptake at the cut edge of the material is a property known as "edge wicking," and is an unacceptable problem for food and beverage packaging due to moisture levels that generally accompany food and beverage goods. In addition, the undesirable properties associated with the use of non-wood fiber into paper products increases with the amount of non-wood fiber used as a substitute for wood fiber. As a result, paper products including citrus fiber have not been adopted for the packaging or storage of commercial liquid products.

SUMMARY

As a result of identifying surface-active impurities of fibers of fruits, and developing a process for removing those impurities, the historical barrier of edge-wicking that has been a limitation for using paper products produced from a combination of wood fiber and fruit fiber has been substantially removed. The combination may include concentrations of fruit fiber of 20% to 30% or higher with substantially no edge wicking (i.e., levels of edge wicking that are suitable for commercial use).

One embodiment of a paperboard material may include a first fiber derived from a wood source, and a second fiber derived from a fruit source. The second fiber may be substantially free of surface active components.

One embodiment of a method for producing a paperboard material may include obtaining a first fiber derived from a wood source. A second fiber derived from a fruit source may be obtained. The second fiber may be substantially free of surface active components. A blended pulp including the first fiber and the second fiber may be prepared. A paperboard material may be produced from the blended pulp.

BRIEF DESCRIPTION OF THE DRAWINGS

Illustrative embodiments of the present invention are described in detail below with reference to the attached drawing figures, which are incorporated by reference herein.

DETAILED DESCRIPTION

Figure 1:
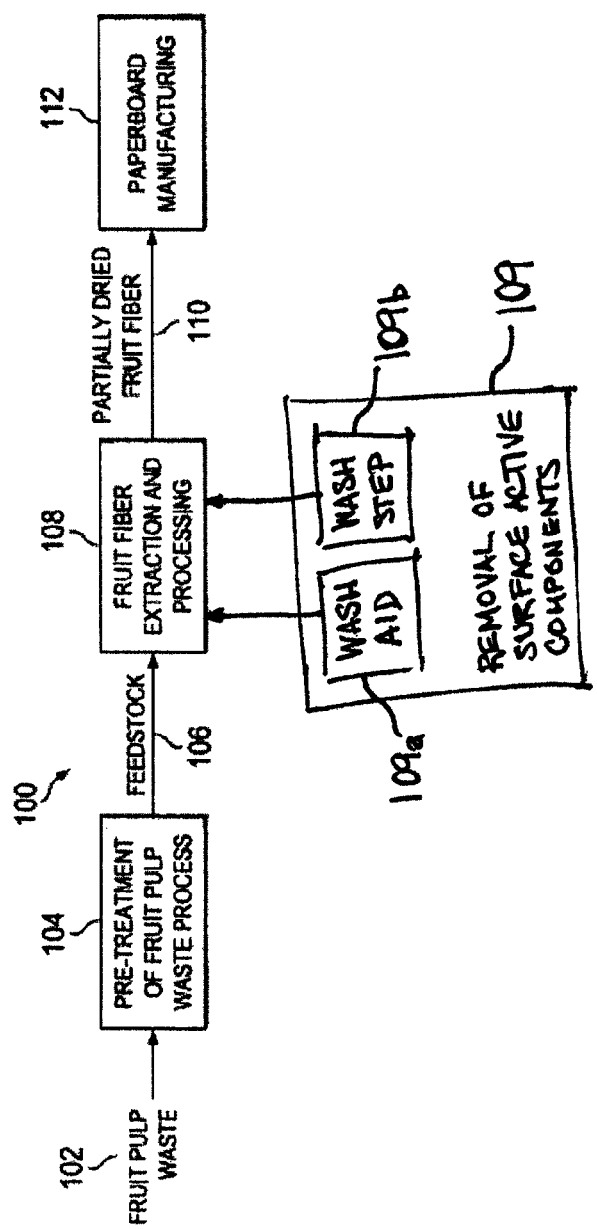
FIG. 1 is a flow diagram of an illustrative process for pre-treating wet fruit pulp by-product and treating fruit fiber for use in paperboard manufacturing.

Edge wicking presents a significant problem for the production of commercial paper and packaging products using a combination of wood fiber and non-wood fiber. Products derived from non-wood fiber, or from wood fiber blended with non-wood fiber, have conventionally exhibited high rates of liquid uptake on the surface or at cut edges, making them unacceptable for storing or transporting moist or wet foods or liquid materials. The utility of non-wood fiber in commercial packaging has therefore been extremely limited, as previously described.

Methods of producing paper materials including non-wood fiber and having reduced or limited edge wicking properties as compared to convention paper including non-wood fiber, as well as paper materials produced by the disclosed methods, are provided herein. Compositions including fiber derived from fruit, that exhibit reduced or eliminated edge wicking are further provided herein.

Processes for obtaining products that contain liquids with limited edge wicking may include processes with at least one process step capable of removing surface active components from fruit pulp, blended pulp, or paper products. As used herein, "surface active components" include oils, fatty acids, or other aliphatic and aromatic moieties that lower the surface energy of the pulp to accelerate wicking. Processes provided herein may result in citrus pulps or blended pulps that are sufficiently free of surface active components (e.g., less than about 10% of the surface active components that are originally active in affecting edge wick present in a fruit pulp), able to "pass" the standards and targets for liquid penetration and uptake. Certain embodiments therefore provide for paper or packaging products having superior limited edge wicking properties, including packaging containing fruit fiber extracted from fruit by-product, and methods for making the same. Oils are known to be found in citrus, and include several terpenes, of which D-limonene is the most widely commercially recognized. Also found in the peels of citrus are aldehydes and aliphatic long-chain alcohols, such as octanol.

In certain embodiments, methods for processing fruit pulp to be utilized in producing paper products, such as papers and packaging, containing fruit fiber as a substitute for wood fiber are provided.

In other embodiments, paper or packaging materials including up to 30% or higher fruit-derived fiber and exhibiting limited edge wicking are provided by utilizing the processes described herein.

I. Method of Processing Fruit By-Product

One embodiment provides a method for processing fiber derived from fruit that produces paper products including a blend of wood fiber and fruit fiber. In certain embodiments, a process may include: (i) providing a fruit by-product, (ii) optionally treating the fruit by-product to produce a refined fruit by-product, (iii) blending the fruit by-product with a wood fiber to produce a blended fiber, (iv) optionally neutralizing charge of the blended fiber; (v) removing surface active components from the blended fiber; and (vi) producing a paper product from the blended fiber.

The fruit by-product described herein can be treated further (e.g., dried, brightened, further refined, filtered, or screened) to provide a fruit fiber that can be used for different papers and/or types of packaging. Fruit by-product may be any component of an edible fruit of a plant that remains after processing the edible fruit to produce food for human or animal consumption. For instance, fruit by-product includes but is not limited to internal membranous tissue within the fruit. The internal membranous tissue includes, but is not limited to, flavedo, albedo, endocarp, segment membranes and the like, of citrus, as is known in the art. Fruit "by-product" includes pulp and other subfractions, such as peel (exocarp), seeds, and the like. As used herein, "pulp" includes sub-fractions of citrus, such as albedo (mesocarp), segment (endocarp), and segment membranes. Generally, the term "fiber" is used to refer to extracted or isolated fibrous material from fruit by-product, as opposed to "by-product" or "pulp," which refers to the fiber and other structural and chemical compositions (e.g., pectin) in edible fruit.

With regard to FIG. 1, a flow diagram of an illustrative process 100 for pre-treating fruit by-product and treating fruit fiber for use in paperboard manufacturing is shown. The process 100 may start by providing fruit by-product 102, such as wet fruit by-product, into a pre-treatment of a fruit by-product process 104. The process 104 may be used to prepare a feedstock 106 by washing, removing molasses, removing non-fruit components and non-fibrous dissolved matter (e.g., leaves, seeds, solids with sugars, and other components and plant parts, such as wood, stalks, and leaves), and/or applying a brightening agent to the fruit by-product 102. By pre-treating the fruit pulp by-product 102 to be cleaner, and hence brighter, the fruit by-product may be a better feedstock than currently available, which is generally cattle feed pellets with molasses. In one embodiment, the feedstock may be provided from the process 104 in a variety of forms, including a slurry, pellets without binding material, cellulose feedstock with about 1% to about 10% fiber, or in some embodiments about 2% to about 5% fiber, or otherwise.

The feedstock 106 may be provided to a fruit fiber extraction and processing process 108. The process 108 may extract or otherwise isolate fruit fiber from the fruit pulp. The process 108, in addition to extracting fruit fiber from the fruit pulp, may also brighten the fruit fiber, as further described herein with regard to FIG. 3, so as to be brighter and more usable for different types of paper, such as product packaging and writing paper. Output from the process 108 may be partially dried fruit fiber 110. In one embodiment, the partially dried fruit fiber 110 may be in the form of wet lap, loose bales, etc. In drying the fruit fiber 110, any system and process for partially drying the fruit fiber may be utilized, including but not limited to using mechanical force (e.g., compressing the fruit fiber), air drying, fluidized bed drying, P-ring drying, freeze drying, and the like, or combination thereof.

The feedstock 106 may also be provided to a process 109, as further described herein, for removal of surface active components. Output from the process 109 may be feedstock in which surface active components have been substantially removed. For example, output from process 109 may include only trace levels of surface active components, such as less than about 10% of the original levels of surface active components. The process 109 may include the introduction or injection of a washing aid 109a followed by a washing step 109b. A washing aid 109a can be a detergent, and may include one or more surfactants (e.g., the non-ionic surfactant Ashland DPI 461).

The feedstock 106 may further be provided to a process 112 for paperboard manufacturing. In certain embodiments, paperboard or packaging materials provided by the processes disclosed herein exhibit reduced or eliminated edge wicking compared with conventionally prepared paper products.

Figure 2:
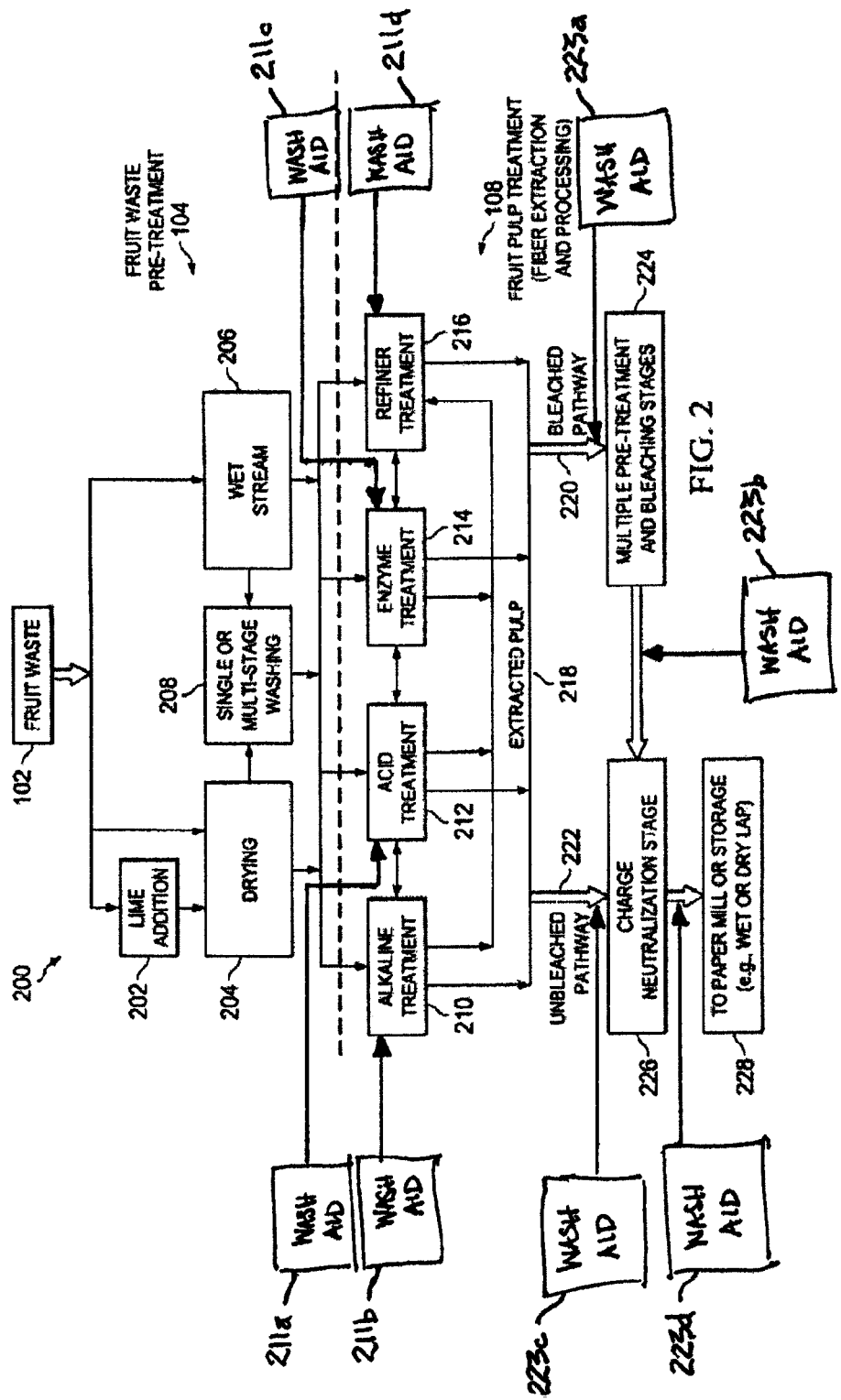
FIG. 2 is a flow diagram of a more detailed illustrative process for pre-treating wet fruit pulp by-product and treating fruit fiber for use in paperboard manufacturing.

With regard to FIG. 2, a more detailed illustrative process 200 for the fruit by-product pre-treatment process 104, the fruit fiber treatment process 108 to extract and process fruit fiber, and the surface active component processing 109 for use in paperboard manufacturing is shown.

A. Fruit By-Product

The fruit by-product 102 provided to the pre-treatment process 104 may vary amongst different fruits, but contains an adequate amount of pulp and fiber for use as a wood fiber replacement. The fruit by-product may be wet by-product, never dried by-product or pulp (fresh-never dried by-product or pulp), dry by-product or pulp, or pelleted by-product or pulp. The fruit by-product 102 may contain residual peel, rags/sacks, and seeds, as described further herein. In one embodiment, the fruit by-product is a citrus by-product and is in the form of citrus pellets, which, as understood in the art, is commonly used as animal feed.

Pelleted fruit by-product may be produced in varying ways using a variety of fruit source materials that may impact the content and characteristics of the pellet, as understood by one skilled in the art. For example, specific processing procedures may vary from one production source to another and may vary with in the same source throughout the season. The basic procedure for producing fruit pellets generally includes grinding or chopping fruit and then dehydrating the fruit residue. The fruit residue is either dehydrated or pressed and molasses is produced from the pressed liquor. A portion of the molasses is sometimes added back to the fruit pulp during a drying process to bind the pulp by-product. The finer particles of the dried pulp are often removed and either sold as citrus meal or pelleted and added back to the pulp. These and other differences in processing, in source and variety of fruit, and in type of fruit food processing operation from which the fruit residue is obtained, may result in variations in the content of dried fruit pulp. However, by not including molasses, a brighter fruit by-product, in whatever form, may be provided to the fruit pulp treatment process 108.

Upon receipt, dry fruit pellets containing peel, rags and seeds may be tested for moisture content using a drying oven and scale. Moisture content may range, for example, between about 7% and about 18%. Other moisture ranges are possible. The fruit pellets used in subsequent treatments may be stored in tanks, bags, vats, and/or drums.

B. Fruit

Continuing with the fruit by-product 102, any fruit grown from a plant may be suitable for use with the principles described herein. The fruit by-product 102 may include by-product from a single fruit variety or multiple fruit varieties. For example, citrus fruit varieties suitable for use in producing fiber for use in producing paper may include, but are not limited to, any fruit from the *Citrus* genus, such as oranges, sweet oranges, clementines, kumquats, limes, leeche limes, satsumas, mandarins, tangerines, citrons, pomelos, lemons, rough lemons, grapefruits, tangerines, and tangelos, or hybrids thereof. The citrus fruit may be early season, mid-season, or late-season citrus fruit. The pectin content of fruit may vary based on season, where ripe fruit may contain less pectin than unripe fruit. It should be understood that non-citrus fruits (e.g., apples) may alternatively or additionally be utilized. Thus, in one embodiment, a method for isolating and processing non-citrus fruit by-product to obtain non-citrus fruit pulp or fiber may be utilized. These non-citrus materials are also useful in the production of paper and packaging papers, where they may also serve as a substitute for wood fiber. These non-citrus fruits include, for example, apple, mango, and papaya. The fiber and pectin content of these non-citrus fruits would be understood by one of skill in the art to vary.

In certain embodiments, the fruit by-product may include citrus by-product from oranges. In some embodiments, mid-season fruits (e.g., Pineapple and Sunstar varieties) and late-season fruits (e.g., Valencia) may be used to provide adequate cellular fibrous material.

The fruit by-product may include all fruit by-product or a specific fraction of the fruit by-product, where fractions may include, but are not limited to, peels, rags, sacs, and seeds. In one embodiment, peels and rags/sacks are used as a fruit fiber source. In one embodiment, albedo, endocarp or segment membranes and/or vesicle membranes are used as fiber sources individually or in combination.

The solid fruit concentration of the fruit by-product may vary. In one embodiment, the fruit by-product is a wet fruit by-product having a solid fruit concentration of from about 4% to about 30%. In another embodiment, the solid fruit concentration of the wet fruit by-product is about 8% to about 20%. In another embodiment, the fruit by-product is a dry fruit by-product having a solid fruit concentration of from about 80% to about 95%. In a specific embodiment, the dry fruit by-product has a solid fruit concentration in a range from about 84% to about 95%. In other embodiments, the dry fruit by-product can have a minimum solid fruit concentration from about 10%, about 20%, about 30%, about 40%, about 50%, about 60%, about 70%, about 80%, or about 90%. In yet other embodiments, the dry fruit by-product can have a maximum solid fruit concentration from about 30%, about 40%, about 50%, about 60%, about 70%, about 80%, about 90%, or about 95%. The fruit by-product may vary based on type of fruit, density of fruit by-product, concentration of fruit by-product, wetness of fruit by-product, and so on.

C. Pre-Treatment Process

With further regard to FIG. 2, fruit by-product for use as described herein may optionally be pre-treated prior to digestion in order to prepare the material for subsequent treatment steps. The pre-treatment process 104 may involve a single step or multiple steps, where multiple steps may be the same or different. The pre-treatment process 104 may include adding lime to the fruit by-product to dewater the fruit by-product 102 at step 202. At step 204, the fruit by-product 102, which may or may not have had lime added thereto, may be dried. The drying process may include partially or fully drying the fruit by-product 102, with or without lime. In an alternative embodiment, the fruit by-product 102 may be processed as a wet stream at step 206. In one embodiment, single or multi-stage washing processes may be performed at step 208. The washing processes may cause the fruit pulp that is part of the fruit by-product to be cleaned and brightened. Baths, high-pressure sprays, and gentle showers can be used over a water temperature range of ambient to 80° C. Other steps for pre-treating the fruit by-product may be performed, including performing a dewatering step (not shown) that may be part of the drying process at step 204 or subsequent to the washing process at step 208.

More specifically, washing processes 208 may vary, for example, in temperature or number of washes. The water may be cold (less than about 23° C.), ambient (about 23° C.-about 27° C.) or hot (about 50° C.-about 60° C.). Hot water has been shown to remove more soluble components on a relative basis than an equivalent amount of ambient water (e.g., 1% to 5% more). Fresh water washing or a multistage, countercurrent scheme may be employed. Multistage washing has been shown to remove more soluble materials than a single washing (e.g., 1% to 4% more). In a particular embodiment, the number of washing steps may range from two to five or more. The washing step(s) may occur at a fruit juicing plant or at an offsite-processing location. Washing may occur with or without stirring/agitation (i.e., in a quiescent environment). In one embodiment, the washing process at step 208 may remove from about 10%, about 20%, about 30%, about 40%, about 50%, about 60%, about 70%, about 80%, about 90%, or about 100% of the physically accessible soluble materials.

In a particular embodiment, untreated pellets are transferred to a suitable vessel and washed with multiple times (e.g., 9) their weight (e.g., about 10% solids) in ambient (e.g., about 23° C.-about 27° C.) water to both (i) swell the pellets and (ii) remove water soluble materials for a minimum of about 10 minutes to about 15 minutes. Conductivity or pH may be monitored during the multistage pH-neutral water washing of the pulp to determine when the pulp has been sufficiently rinsed.

To further improve brightness of the fruit pulp, a bleaching step may be included. The bleaching step may use bleach or any other chemical or non-chemical process, as understood in the art. In a particular embodiment, the bleaching pre-treatment is a peroxide, alkaline peroxide, or oxygen-alkali treatment. In another embodiment, the bleaching pre-treatment step involves treatment with hydrogen peroxide. For example, there are two, three, or four pre-treatment bleaching steps may be performed. By brightening the fruit pulp, fewer processes, which may be more time consuming and costly, may be performed in the fruit pulp treatment process 108. In addition, an attrition step or any other step useful or necessary to prepare the material for subsequent digestion or brightening may be performed in the pre-treatment processes 104.

In one embodiment, the pre-treatment step may reduce a water retention value (WRV) of the fruit by-product. WRV can be measured, for example, by centrifugally separating water retained in pulp from free water in and between fruit fibers to determine the inherent water-holding capacity of the pulp.

In another embodiment, the pre-treatment process 104 may decrease the chemical load (i.e., the presence of soluble materials, such as sugars or acids) of the material prior to digestion. The chemical load may vary depending upon the type of fruit by-product and/or the processing conditions used to generate the fruit by-product. Pretreatment to remove soluble materials may be particularly useful where molasses has been added to a fruit pellet during processing. Pellets to which molasses has been added may have far greater levels of soluble material (e.g., 40% to 60% or so of the total weight of the dry pellet).

Generally, dried pellets expand in volume upon wetting with excess water and have a several fold water holding capacity over the dry weight of the by-product. About 5 times of the weight of the dry by-product may be taken up by the by-product upon standing. This uptake is rapid and reaches near-steady state equilibrium after about 40 minutes at room temperature.

The pre-treatment process 104 (FIGS. 1 and 2) may involve one or more dewatering steps. For example, the by-product may be subject to washing and then dewatered by any suitable technology, such as pressing swollen pellets through a screw press or over a vacuum-assisted drainage device, by centrifugal force, or by mechanical and/or fabric pressing. Solids and yield of the washed pellet by-product may then be determined by drying a sample. In a particular embodiment, the cake solids levels range may range from about 7% to about 33%.

In yet another embodiment, the pre-treatment process 104 may include an attrition treatment (not shown). Attrition may, for example, permit bleaching chemicals used in another step additional or improved access to the material, i.e., so that diffusion is not limiting. A mechanical means may be used to continuously reduce the size of citrus by-product prior to any bleaching step in order to provide thorough diffusion access of the bleaching chemical to all parts of the by-product. In one embodiment, moderate shear devices (e.g., produced by British Disintegrator) may be used or a continuous and conventional pulp refiner (e.g., double disk refiner, deflaker, etc.) with plate clearances between 0.010" and 0.250" may be used. In particular embodiments, process temperatures may range from about 25° C. to 95° C. As the by-product mass is relatively soft, there are likely many mechanical and frictional means to provide moderate shear to break down larger citrus by-product particles. Optionally, this step may be performed after bleaching unless the fibers and cells are of a sufficient size after bleaching is complete. In one embodiment, the citrus pulp may be screened to exclude larger fiber bundles or unwanted citrus waste through slotted screens and/or hole screens common to the paper industry.

Continuing with FIG. 2, the fruit by-product treatment process 108 may be used to extract and process fruit fiber. The extraction may be performed using a variety of different techniques and processes, as further described hereinbelow.

D. Digestion/Extraction Process

The digestion/extraction process of the fruit by-product treatment process 108 may isolate fruit fibers and cell wall fragments useful in contributing as a constituent to a paper-making substrate. Pectin (polygalacturonic acid) acts as the stabilizing "cement" that holds cells together in peel, sacks, and seed ultra-structures of fruit. Specifically, pectin is present in cell walls and between the cells, where the middle lamella is a pectin layer that cements the cell walls of two adjoining cells together. A substantial majority of the inter-lamellar cellular material in fruit includes pectin. The amount of pectin may vary by fruit type or by season, as cell wall disassembly during ripening is the main process leading to fruit growth and maturation. The digestion/extraction process is performed to remove the pectin (viewed here primarily as a by-product product) in order to isolate the desired material, i.e., the fruit fibers.

Any method suitable for digesting pectin and/or extracting fruit fiber is suitable for use in accordance with the principles described herein. Digestion methods may include, without limitation, chemical treatment, such as an alkaline treatment 210 and/or acid treatment 212, enzymatic treatment 214, refiner/mechanical treatment 216, or a combination thereof. In some embodiments, the digestion or extraction steps provided herein result in fiber or pulp and/or other material that is substantially free of pectin. For example, the processes provided herein may result in material having a pectin content from between about 15% and about 25% to about 1% and about 4% on a dry weight basis of the original pectin content. Alternative measures may be utilized. This pulp or fiber is substantially free of the pectin that holds the fibers together by the walls of the fibers.

The alkaline treatment 210 may be used to digest pectin of the fruit by-product. The alkaline treatment may include, without limitation, sodium hydroxide and sodium sulfide, or combinations thereof. For convenience, an alkaline liquid to dry pulp ratio ranging from about 5:1 up to about 25:1 may be used to treat the pulp with alkali. The alkaline digestion may be carried out in a quiescent setting or by using agitation.

The acid treatment 212 may alternatively or additionally be used to digest pectin of the fruit by-product. Acids that may be used to perform the digestion of the pectin may include mineral, including, without limitation, nitric acid, sulfuric acid, hydrochloric acid, phosphoric acid, boric acid, hydrofluoric acid, hydrobromic acid, and perchloric acid. Treatment liquor to pulp ratios in the range of about 5:1 to about 50:1 are suitable for use, although pectin removal may be facilitated by additional dilutions, e.g., 30:1. Target pH of the acid treatment may range from about 1.1 to about 2.3, although consumption of acid may require addition of acid during treatment. Optionally, a chelant (e.g., EDTA and DPTA) may be added during or after treatment to sequester any free metal ions freed from the digestion and treatment. In one embodiment, the pH may be increased post-treatment to enhance the effectiveness of the chelant. Moderate shear may optionally be applied by stirring or using agitation to facilitate extraction of a more-resistant pectin fraction.

In one embodiment, temperatures may be elevated (e.g., 70° C. to 175° C.) to accelerate solubilization of interlamellar material. Due to the presence of many organic acids naturally occurring in the citrus pulp and acidic hydrolysis products formed during processing, pH can drop to below neutral in the alkaline treated pulp. Monitoring pH during this stage may be performed so that refortifying the liquor with additional alkali to maintain higher target pH can be achieved. Alkali treatment can be applied for short periods of 15 and up to 120 minutes at target temperature and pH. Total heating time is determined by the temperature ramp rate controlled by the thermal load capacity of the equipment used in heating and by whether direct or indirect heating is employed.

In another embodiment, the fruit by-product may be digested by an alkaline treatment followed by an acid treatment. The combined use of alkaline and acid treatments is useful to reduce pectin levels early in processing steps due to the solubility of both calcium pectate and nascent pectin. The pH, residence time, and temperature of the chemical treatment can vary with regard to what type and variety of fruit is being extracted. In one embodiment, the pH range for the acid treatment is from about 1.1 to about 2.3 and more specifically, from about 1.6 to about 1.8. In one embodiment, the pH range for the alkaline treatment is from about 9.0 to about 12.50. In another embodiment, the residence time for the chemical treatment is from about 15 to about 120 minutes or more specifically, from about 60 to about 90 minutes. In yet another particular embodiment, the temperature ranges from about 70° C. to about 175° C. Other pH and temperature range combinations may be utilized for extracting fruit fiber from pectin.

In a particular embodiment, the alkaline treatment 210 is applied in either a pressurized or open vessel. About 2.5% sodium oxide ($Na_2O$, applied as sodium hydroxide) is then applied with about 15% to about 20% $Na_2O$ causticity added as sodium sulfide. At 10% washed citrus pulp solids, chemicals are added and heat is applied by direct or indirect steam, depending on the vessel design, to about 90° C. pH is typically above 12.0 at the introduction of the chemicals and monitored throughout the caustic treatment. The pulp pH may drift as nascent acids neutralize the caustic liquor. After the pH drops to below about 8.0, the alkaline treatment 210 may be stopped as any substantial alkaline-driven reaction has ended. The pulp may then be washed to remove residual alkali and reaction products in hot water across a vacuum assisted drainage funnel or through a batch or continuous centrifuge, depending on the quantity treated. Solids and yield may then be determined.

The system 200 may be configured to remove surface active components, which may include oils, fatty acids, or other aliphatic moieties that lower the surface energy of the pulp and accelerate wetting (edge wicking) by using a washing aid 211a-211d (collectively 211) and/or 223a-223d (collectively 223). The washing aid 211 may be provided for the removal of the surface active components by introducing or injecting the washing aid 211 into any of treatment tanks 210-216. A washing aid 211 can be a detergent and can comprise one or more surfactants (e.g., the non-ionic surfactant Ashland DPI 461).

In another particular embodiment, the acid treatment 212 may be used to extract the fruit pulp by using a mineral acid, such as nitric or sulfuric acid. The pulp is suspended at about 4% solids in heated water with moderate agitation. The pulp may then be heated to about 60° C. to about 90° C. and acid added until a pH of 2.0 is achieved. pH may then be monitored about every 10 minutes as the acid is neutralized and/or consumed. A supplement of additional acid may performed to maintain the pH at a pH level of 2.0. After about 90 minutes, pH may then be adjusted upward to a range from about 3.8 to about 4.2 with sodium hydroxide and a chelant added at 800 ppm, based on starting citrus pulp solids. The chelant may be, for example, DPTA. The pulp may then be diluted to about 5% solid and pumped to a flow through double-disk mechanical refiner and then to a continuous flow separation device for dewatering. The outlet solids may range, for example, from about 15% to about 32%.

In another embodiment, the enzymatic treatment 214 may be used for digesting pectin from the fruit by-product to extract the fruit pulp. An enzymatic treatment may be used as an alternative to the alkaline treatment 210 and/or acid treatment 212 or be used in combination with those digestion methods. The enzyme may be, for example, a pectinase. Representative, non-limiting pectinases include pectin galacturonase, pectin methylesterase, pectate lyase, and pectozyme. In a specific embodiment, the enzyme is a cocktail of pectin galacturonase pectin methylesterase, and pectate-lyase. The pH and temperature conditions may be dictated by the particular enzyme, as is understood by one of skill in the art. In one embodiment, the temperature may range from about 25° C. to about 55° C. and the pH may range from about 3.5 to about 8.5.

In a still further embodiment, the fruit by-product may be digested by chemical treatment in combination with the refiner or mechanical treatment 216. Where chemical treatment may be supplemented by an additional digestion or extraction, the additional mechanical treatment 216 may be used before or after the chemical treatment. For example, a mechanical or enzymatic treatment can be used either pre- or post-chemical treatment.

Extracted fruit pulp 218 from any of the treatments 210, 212, 214, and 216 may flow along two optional pathways, a bleached pathway 220 and/or unbleached pathway 222. If the extracted pulp 218 flows along the bleached pathway 220, a removal of surface active components process 223 may be performed before 223a or after 223b multiple pre-treatment and bleaching stages 224 to further clean and increase brightness of the extracted pulp 218, as further described with regard to FIG. 3. If the extracted pulp 218 flows along the unbleached pathway 222, then a removal of surface active components process 223 may be performed before 223c or after 223d a charge neutralization stage 226 to neutralize charges of the extracted pulp 218. A removal of surface active components process 223 may alternatively and/or additionally be performed after charge neutralization stage 226 or pretreatment and bleaching stages 224. The removal of surface active components processes 223 may be the same or different depending on the surface active component types and levels each of the stages in the fruit fiber extraction process 108.

E. Charge Neutralization

Any suitable agent or process capable of modifying or neutralizing the size and charge effects of the refined or extracted fruit by-product or pulp 218 can be used in accordance with the principles described herein. Neutralizing agents include, but are not limited to, cationic neutralizing agents including cationic monomers, cationic polymers, cationic coagulations, cationic flocculants, and nonpolymeric cationic species. Cationic coagulants are effective in neutralizing and drawing together components in the fruit pulp. A class of higher molecular weight cationic flocculants is also effective in tying smaller particles and appendages to larger particles, thus facilitating drainage.

Poly-aluminum chloride (PAC) and aluminum sulfate (alum) or other cationic monomers have also each been found to be effective in reducing the charge in the citrus pulp, and thereby, facilitating drainage and dewatering. Adjusting pH to near-neutral after application of these moieties under acidic conditions may prove effective in insolubilizing these materials while satisfying cationic demand, once re-wet. In one embodiment, the neutralizing agent constitutes from about 0.5% to about 6.0% on an as-received pulp dry weight basis.

In a particular embodiment, the cationic agent satisfies about 30%, about 40%, about 50%, about 60%, about 70%, about 80% or about 90% or about 100% of the surface charge of the refined fruit pulp. The amount of the neutralizing agent may vary, as would be understood by one of skill in the art. In one embodiment, the neutralizing agent is about 2% to about 12.0% on a pulp dry weight basis. In one embodiment, the addition of the neutralization agent increases the drainage rate of the refined citrus pulp by greater than about 40%, about 50%, about 60%, about 70%, about 80%, about 90%, about 100%, about 200% or more in comparison to a refined fruit pulp not subject to neutralization.

F. Removal of Surface Active Components

Fruit fiber or blended fiber as described herein may be used in producing paperboard, which can be assembled as a part of a multilayer liquid packaging substrate comprising paperboard sandwiched between multiple foil and poly layers. This multilayer packaging is converted into aseptic cartons used to package liquids, for example juices, teas, and liquids. While most of the paperboard never comes in direct contact with liquid, there are several situations, either in filling or during shelf storage, where a raw cut paper edge comes in contact with various solutions. Ideally, the cut edges of the board should not uptake liquids beyond a specified limit because additional uptake would result in a loss of carton integrity and possible failure. Again, the ability of the cut edge of the board to uptake liquids is referred to as "edge wicking."

Edge wicking in paper products can be evaluated using a number of industry standard tests. Edge wicking performance may be evaluated in peroxide, for example in approximately 25% to 35% peroxide at approximately 60° C. to 70° C. Edge wicking performance may also be evaluated in lactic acid solution, for example, about 0.5% to about 1% lactic acid solution at room temperature. In these tests, edge wicking performance can be evaluated by thermally laminating test sheets and exposing a specific perimeter edge to the solutions. The weight of the laminated samples before and after exposure for a specified time is indicative of the uptake or wicking potential for the paperboard. Weights may be corrected for the paperboard caliper. Uptake targets and upper reject limits for each test can be established based on requirements for particular paperboard applications.

Edge wicking may be further evaluated using the Cobb test as it represents an effective and rapid indication of improvements in liquid uptake similar to the edge wick test. In the edge wick test, the sample is thermal laminated between polymer sheets and the open area available for uptake is determined by the exposed area of the sheet. Given the exposed area of the sheet (circle of 4" diameter) is constant in a Cobb test, this provided a quick method for creating relative comparisons of the edge wicking method. In the Cobb test (TAPPI Test Method T441), a horizontal clamp ring (11.3 cm internal diameter) clamps the sheet in place and 100 ml of liquid is applied at 23° C. for 120 seconds and blotted at the end. The Cobb value ($g/m^2$) represents the weight of the water absorbed by the sheet as a function of surface area of the sheet (i.e., (([post-soak sheet weight]−[pre-soak sheet weight])÷[sheet surface area])).

In certain embodiments, the processes described herein provide processes for producing paper materials including a stage for the removal of surface active components from fruit fiber or blended fiber. Removal of surface active components may reduce the edge wicking capacity of the fruit fiber or of paper produces including the fruit fiber. For example, oils (neutrals), fatty acids, or other aliphatic moieties may be present in fruit pulp that lower the surface energy of fruit pulp and accelerate wetting (edge wicking). In certain embodiments, processes are provided that mobilize and reduce surface-active impurities. Processes for removal of surface active components described herein may utilize any agent capable of attracting or sequestering the impurities from the pulp and into the aqueous phase. In other embodiments, processes utilizing supercritical $CO_2$ extraction, ionic liquid extraction, acetone extraction, or mixed solvent processing are provided. These approaches combine the relative attractions associated with the functionality of the material being removed. In general, surface active materials reduce contact angles and surface energies resulting in a greater uptake of fluid. Removing the surface active components by an extraction approach is found to be effective as the surface active components preferentially interact with the specific functionality affecting surface energy by either removing the components or neutralizing effects of the components by some mutual attraction and micelle complex formation.

In certain embodiments, a process, including the use of a washing aid, is provided for the removal of surface active components. A washing aid can be a detergent. A detergent may include one or more surfactants. A surfactant can have a hydrophobic tail with or without a functional group. As an example, a detergent can comprise an ionic surfactant having some polar functionality. Surfactants may include dissociative salts, cationic groups, or anionic groups. As another example, a detergent can comprise a non-ionic surfactant (also known as a neutral). For example, a non-ionic surfactant may not have polar functionality. As another example, a non-ionic surfactant can have aliphatic hydroxyl groups as functionality groups. As yet another example, a non-ionic surfactant (e.g., Ashland DPI 461) may exhibit low foaming tendencies under agitation. The washing aids described herein may be present in any amount, such as less than 100 ppm. In various embodiments, the washing aid is present in an amount less than 20 ppm, less than 30 ppm, less than 40 ppm, or less than 50 ppm. The process for removing surface active components provided herein may reduce edge wicking by approximately 90% or more.

G. Intermediate and Post-Treatment Steps

As described above, the processes provided herein may optionally include additional steps. In certain embodiments, the process may involve one or more additional steps as part of the method itself, i.e., intermediate steps following digestion and/or prior to any final step. In other embodiments, the process may involve one or more additional post-treatment steps following any final step. In each instance, the additional step is intended to prepare the material for further processing, including additional steps or the production of an end product. When the additional step is intermediate, the step is normally intended to remove a reaction product (e.g., acid) from the proceeding step. Nonlimiting, suitable intermediate and/or additional steps may include, for example, washing steps, dewatering steps, and/or bleaching steps.

H. Isolation of Fruit Fibers

Following digestion according to any of the processes described herein, fruit fibers may be released into the digest solution and, therefore, may be isolated for further processing. Isolation occurs by applying force to the solution such that the fibers are forced together to form a solid mass of isolated fibers. Force may be applied by a variety of methods as further described herein and include, but are not limited to, a commercial centrifuge or decanter. Also, in this regard, the solid material following pectin digestion, such as by pectinase, may be isolated and used in any suitable method, such as in the preparation of animal feed.

It may be useful or necessary to dewater the isolated fiber produced by the processes outlined herein for further processing, including for the manufacture of paper. Fruit by-product or pulp contains fibers exhibiting a distinct fiber length distribution as compared to fibers from wood pulp and present some unique challenges for dewatering. Without being bound by any theory, it may be that fruit by-product or pulp also exhibits both surface and internal anionic charges that may enlarge the hydrodynamic surface of the fibers, thus impeding drainage. If the process is to include use of the fibers obtained from the fruit by-product or pulp to be integrated into a paper mill site, then subsequent treatment may be used so as reduce or eliminate drainage impedance during the papermaking process. If, however, the fiber obtained from the fruit by-product or pulp is to be manufactured and then stored as a wet or dry lap, then it may be also necessary to treat the fiber with dewatering agents converting it to a compact form for shipment.

Following isolation of the fibers, in one embodiment, the process 200 optionally includes one or more intermediate bleaching treatments, as provided by the multiple pre-treatment and bleaching stages 224. If the ultimate destination of the fruit pulp is for inclusion in an unbleached paper substrate, it may not be necessary to include a bleaching step. If, however, the fruit pulp is destined for inclusion into bleached products and specified pulp brightness is a feature of the pulp, then brightening process steps may be used to successfully achieve these objectives.

Brightness is generally defined as the percentage reflectance of blue light only at a wavelength of 457 nm. Brightness is typically measured/expressed as GE brightness. GE brightness is measured with directional light incident at 45° with respect to the normal to the sample. The photodetector is mounted on the normal and receives light reflected along the normal-conditions sometimes expressed by the shorthand notation (45° illumination, 0° observation). GE brightness is measured relative to a Magnesium oxide serves as the standard at a GE brightness of 100, where all pulp and paper has GE brightness less than 100.

Both oxidative and reductive bleaching chemistries may be employed in the high brightness development of citrus pulp. Oxidative approaches have proved most effective in both laboratory and pilot plant processes. The bleaching may involve a single or multiple steps. The bleaching agent may be, for example, chlorine dioxide.

Figure 3A:
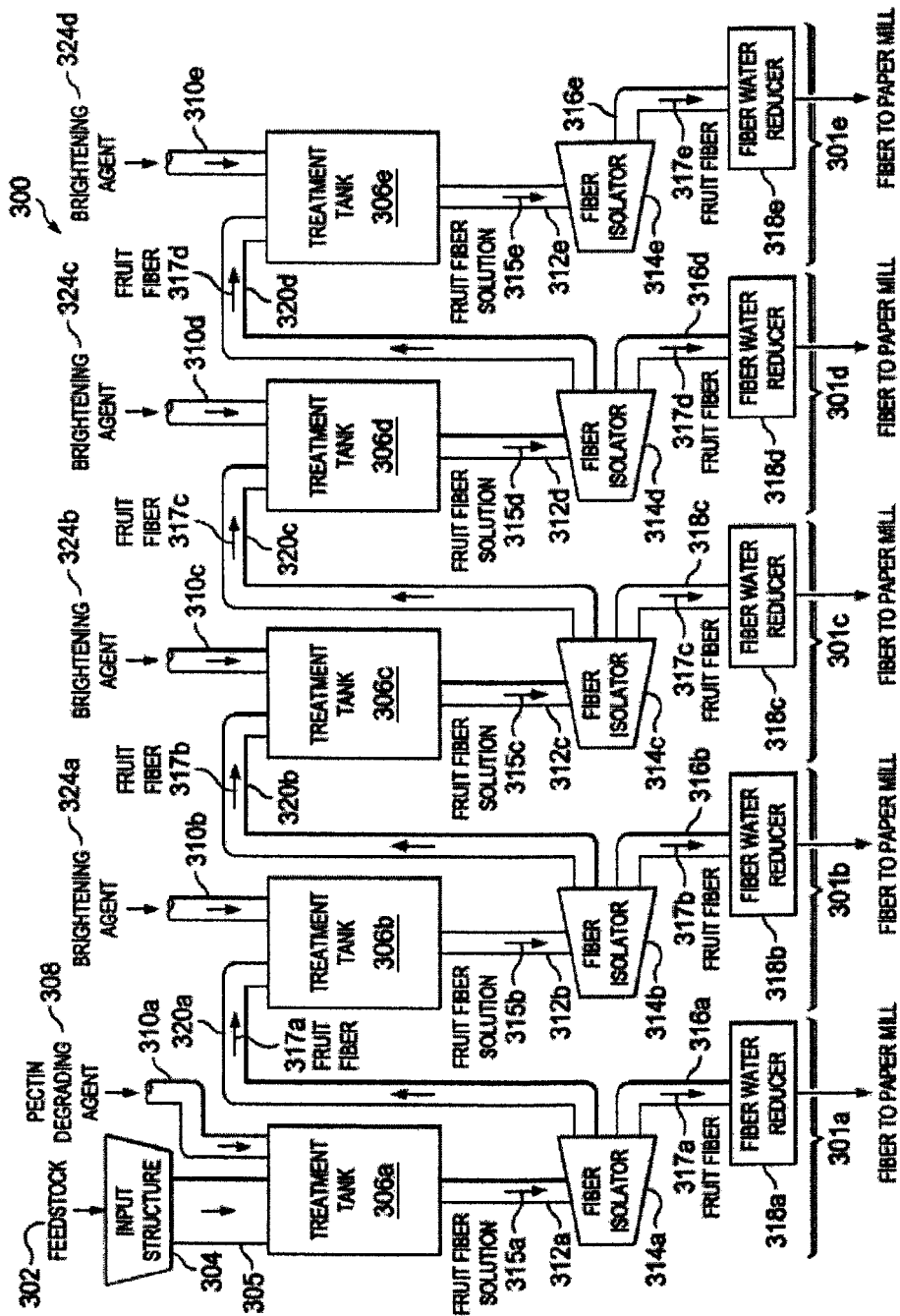
FIG. 3A is a schematic diagram of an illustrative system for use in extracting and processing fruit fiber to produce brightened fiber for use in paper and packaging products with reduced edge wicking.

With regard to FIG. 3A, a schematic diagram of an illustrative system 300 for use in extracting and processing fruit fiber from feedstock 302 to produce brightened fiber for use in paper and packaging products is shown. The system 300 includes multiple stages 301a-301e (collectively 301) for use in extracting and processing the fruit fiber. The first stage 301a may include an input structure 304, such as a hopper, that allows for the feedstock 302 to be input into a reactor or treatment tank 306a of the system 300 via a conduit 305. The treatment tank 306a may be configured to receive the feedstock 302 for processing, such as removing pectin from the feedstock 302 by using a pectin degrading agent 308 via input conduit 310a. The degrading agent 308 may be any agent, such as an alkaline, acid, or enzyme, that may be mixed with the feedstock 302 in the treatment tank 306a for removing the pectin in the feedstock 302. As a result of mixing the agent 308 with the feedstock 302, the pectin is removed from fruit fiber contained within the feedstock 302, and a solution inclusive of the fruit fiber is formed.

An output conduit 312a may be in fluid communication with a fiber isolator 314a to transport fruit fiber solution 315 (i.e., solution containing fruit fiber released from the fruit pulp). The fiber isolator 314a may be a decanter, centrifuge, agitator, fiber refiner, or any other mechanical or electromechanical device that is capable of isolating or separating the fiber from the solution. In some embodiments, the isolated fiber 317a may be subjected to a removal of surface active components process 318a before being directed to a fiber water reducer 321a. As previously described, if the paper or packaging, such as brown paper bags, into which the fiber from the feedstock 302 will be incorporated is not bright, then the fiber isolator 314a may output the isolated fiber 317a from the fiber isolator 314a via conduit 316a to a fiber water reducer 321a. The fiber water reducer 321a may be used to reduce or remove water from the fiber output from the fiber isolator 314a or process for removal of surface active components 318a to create a fiber with reduced water content for providing to a paper mill to be included with wood pulp in making paper products. The fiber water reducer 321a may be a wide variety of machines that use a wide variety of processes, including a machine and process for making wet lap, dry lap, flour, or any other form of fiber material for delivery to a processing destination, such as a paper mill. The various machinery may include presses, dryers, and commercial wet lap machines. In certain embodiments, output from the fiber water reducer may be directed to a removal of surface active components process 322a.

As previously described, certain quality and types of papers are meant to be brighter or have certain qualities that use certain fiber types (e.g., finer or coarser fiber). In addition to using treatment tank 306a to removing the pectin from the feedstock 302, the principles described herein provide for additional reactor or treatment tanks 306b-306e. Each of these treatment tanks 306 may be used to increase brightness of the fiber that is processed by a previous treatment stage by use of a brightening agent.

As shown, output conduits 312a-312e may flow the treated fruit fiber solutions 315a-315e from the treatment tanks 306a-306e (collectively 306) to respective fiber isolators 314a-314e (collectively 314). The fiber isolators 314, as previously described, may be configured to isolate the fiber from solution or non-fibrous material. Conduits may transport fruit fiber 317a-317d isolated or otherwise separated from the solution by the respective fiber isolators 314a-314d. Conduits 310b-310e are used to input brightening agent into respective treatment tanks 306b-306e. In one embodiment, the brightening agents 324 are identical. Alternatively, the brightening agents 324 may be different (e.g., same agent with different pH levels or different agents). Also coupled to each of the fiber isolators 314b-314e are fiber water reducers 321b-321e, which output fruit fibers (not shown) to be delivered to paper mills for inclusion with wood fiber for manufacturing paper. The output fruit fibers from the different fiber water reducers 321a-321e may be fruit fibers that (i) have been isolated from solution with reduced water content, and (ii) have successively increasing levels of brightness. That is, the output fiber from fiber water reducer 321a is the least bright and the output of fiber water reducer 321e is the brightest.

Figure 3B:
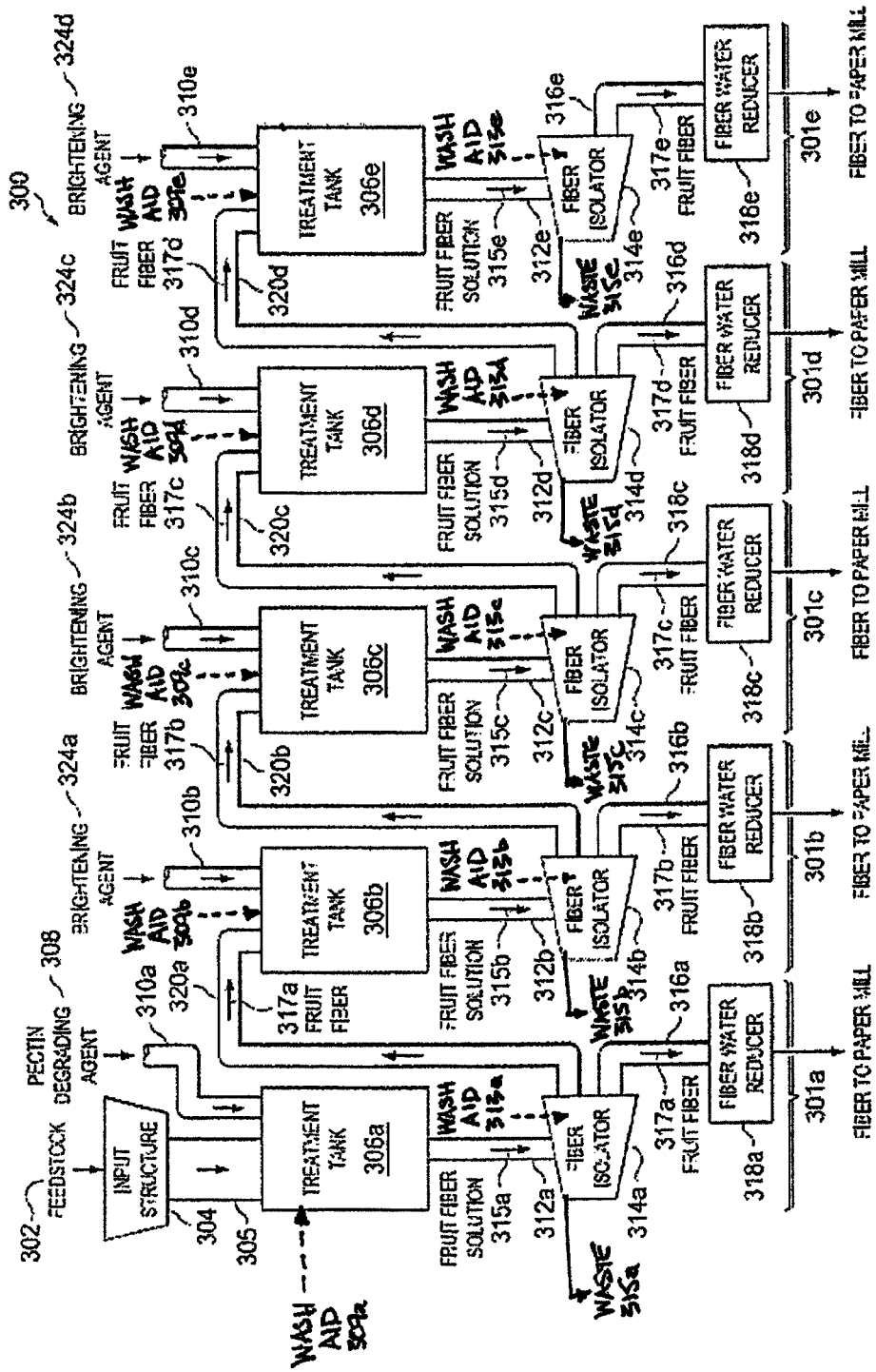
FIG. 3B is a schematic diagram of an illustrative alternative system for use in extracting and processing fruit fiber from feedstock to produce brightened fiber for use in paperboard with reduced edge wicking.

With regard to FIG. 3B, a schematic diagram of an illustrative alternative system 300 for use in extracting and processing fruit fiber from feedstock 302 to produce brightened fiber for use in paperboard with reduced edge wicking is shown. The system 300, similar to that described in FIG. 3A, may be configured to receive the feedstock 302 for processing, such as removing surface active components or waste 315a-315e (collectively 315), which may include oils, fatty acids, or other aliphatic moieties that lower the surface energy of the pulp and accelerate wetting (edge wicking) by using a washing aid 309a-309e (collectively 309) and/or 313a-313e (collectively 313). The washing aid 309 and/or 313 may be provided for the removal of the surface active components by introducing or injecting the washing aid 309a-309e or 313a-313e into any of treatment tanks 306a-306e or fiber isolators 314a-314e, respectively. A washing aid 309 and/or 313 can be a detergent and can comprise one or more surfactants (e.g., the non-ionic surfactant Ashland DPI 461).

Figure 4:
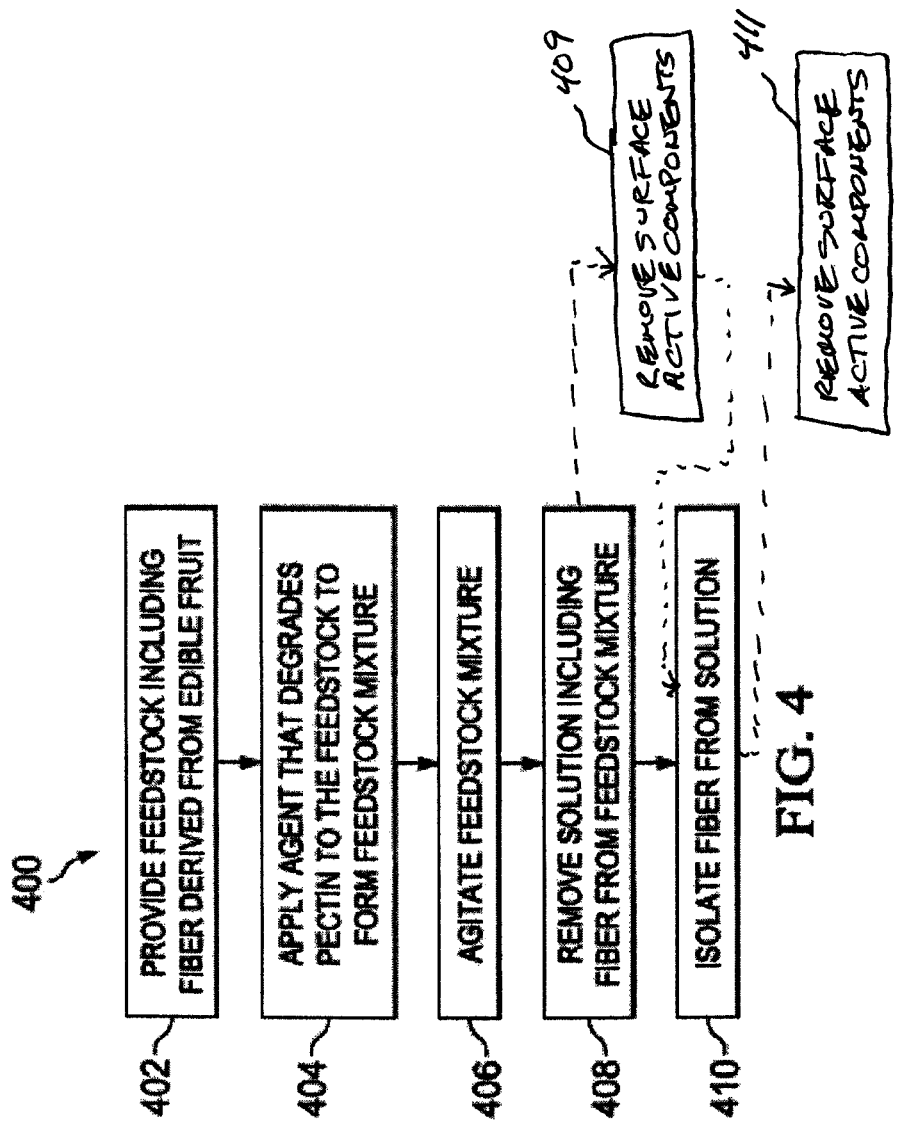
FIG. 4 is a flow diagram of an illustrative process for extracting fruit fiber from fruit by-product.

With regard to FIG. 4, a flow diagram of an illustrative process 400 for extracting fruit fiber from fruit by-product is shown. The process 400 may start at step 402, where a feedstock including fiber derived from edible fruit of a plant may be provided. The edible fruit may be a citrus or non-citrus fruit, as provided hereinabove. At step 404, an agent that degrades pectin may be applied to the feedstock to form a feedstock mixture. In applying the agent, the agent may be applied to the feedstock in a treatment or reaction tank, as understood in the art. The feedstock mixture may be agitated to cause the agent to be more effective in degrading the pectin at step 406. At step 408, solution including the fiber from the feedstock mixture may be removed. In removing the solution, the solution may be removed from the treatment tank by using any process that leaves solid by-product in the tank while removing the solution with the fiber desired to be isolated for use in manufacturing paper. Optionally, at step 409, surface active component removal may be performed, for example by utilizing a washing aid, such as Ashland DPI 461 washing aid. At step 410, the fiber may be isolated from the solution. In isolating the fiber, a decanter, centrifuge, or any other mechanical or mechanical electrical device may be utilized. At step 411, as an alternative to or addition to step 409, surface active component removal may be performed using a washing aid. The washing aid may be the same or different from the washing aid of step 409 and in the same or different concentration as used in step 409.

Figure 5:
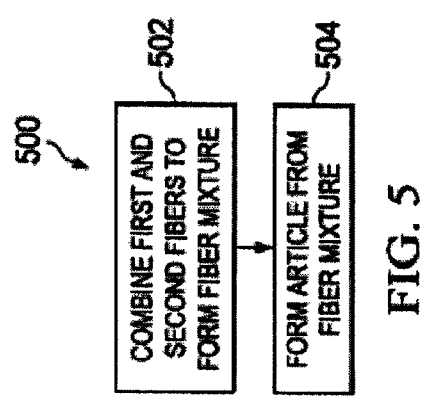
FIG. 5 is a flow diagram of an illustrative process for combining fruit fiber with wood fiber to form an article from the fiber mixture.

With regard to FIG. 5, a flow diagram of an illustrative process 500 for combining fruit fiber with wood fiber to form an article from the fiber mixture is shown. The process 500 may start at step 502, where first and second fibers may be combined to form a fiber mixture. The first fiber is a wood fiber and a second fiber may be a fruit fiber that is substantially free of surface active components, as previously described. The fruit fiber may also be substantially free of pectin. In combining the two fibers, the fibers may be combined in any manner that provides for manufacturing of paper with the two types of fibers (i.e., wood fiber and fruit fiber). The combined or blended fibers may be further subjected to a process for removing surface active components as shown in step 502. In one embodiment, in combining the first and second fibers, fruit fibers that are substantially similar in shade or brightness to wood fiber may be selected and combined with the wood fiber. Such similarly shaded fruit fiber may be increased in brightness using the system and processes shown in FIG. 3, for example. At step 504, an article may be formed from the fiber mixture. The article may be any paper article, as understood in the art.

II. Method of Manufacturing an Article Comprising Fruit Fiber

The principles described herein further relate to a method for processing fruit by-product to provide fruit fiber for use in the preparation of an article comprising the fruit fiber. In an embodiment, the article includes fiber from multiple fiber sources, such as from wood and from fruit, as described herein. In an embodiment, the article may be paper and/or packaging materials. The method may include production of storage or transport forms of fruit fiber, such as dried, bagged, bailed, compressed fiber, wet lap, or dry lap, as well as the production of paper therefrom.

Specifically, the method involves processing fruit by-product to provide a fruit fiber storage or transport form, including (i) providing a fruit by-product; (ii) digesting the fruit by-product; (iii) isolating the fiber from the digest solution; and (iv) dewatering the isolated fiber. The fruit fiber storage form may be a dried, bagged, bailed, compressed fiber, wet lap, or dry lap. The fiber in forms has generally undergone some compaction, drying, or consolidation, but has not been dried. These forms are feasible for short distance transportation and if the fiber is to be used immediately at user end (e.g., paper mill). Dry lap would normally be expected to have far less moisture, i.e., about 20% or less.

The present disclosure is also directed to a method for making paper, such as a packaging paper, including (i) providing a fruit by-product; (ii) digesting the fruit by-product; (iii) isolating the fiber from the digest solution; (iv) dewatering the isolated fiber; and (v) blending the isolated fiber with wood fiber to create a blended fiber; and (vii) producing paper from the blended fiber. In an embodiment, the fruit fiber may be in wet form when combined with wood fiber.

The fruit fibers (e.g., citrus fibers or non-citrus fruit fibers) are blended with wood fiber. The wood fiber component may be either a softwood fiber or a blended hardwood/softwood fiber. While the wood fiber stock is common to all commercially utilized North American coniferous and deciduous tree species, it should reflect the variants of these genera from other parts of the world. Generally, the citrus or non-citrus fiber may replace a portion of the wood fiber component of the paper. In one embodiment, the wood fiber-reduced paper is reduced by about 1%, about 2%, about 3%, about 4%, about 5%, about 6%, about 7%, about 8%, about 9%, about 10%, about 11%, about 12%, about 13%, about 14%, about 15%, about 20%, about 25%, about 30%, about 35%, about 40%, about 45% or about 50%, about 60% about 70%, about 80%, about 90%, about 95%, about 99% in comparison to standard paper or packaging paper.

In a particular embodiment, the dewatered fruit fiber is used to make paper. The fiber is diluted to about 3% solids in an agitated tank and then sampled for streaming potential charge. Aluminum sulfate (alum or conventional cationic, coagulant, flocculent, or micro particle chemistries) may be added to the fiber at a rate of about 65 lb./ton to neutralize the charge and improve drainage. In another agitated tank, never-dried, commercially manufactured bleached wood based fiber inclusive of softwood and hardwood pulp at a 70:30 ratio, respectively, may be introduced at about a 3% consistency. The wood fiber blend may then be refined to a desired freeness range, expressed as Canadian Standard Freeness (CSF). In a particular embodiment, the CSF is 450. The wood and citrus fibers may then be blended at about a 90:10 ratio, respectively. Freeness testing may be assessed. The desired CSF may vary. In one embodiment, the CSF ranges from about 300 to about 500 CSF. It is possible to adjust the CSF of the wood fiber component in order to impact the CSF of the blended fiber, for example. The blended fiber may then be pumped to the headbox of the pilot paper machine. The blended fiber may then be drained, pressed, and dried. A starch surface size may be applied and further dried before being wound up on a core. A wide variety of methods are known for the manufacture of paper, as would be understood to one of skill in the art.

III. Wood Fiber-Reduced Paper Including Packaging Paper

Fruit fiber prepared by method above is blended with wood fiber (e.g., softwood or hardwood or hardwood/softwood blends) to create a blended fiber useful in a variety of articles, such as paper, including but not limited to, packaging paper, food cartons, and so on. The properties of the paper material or end product dictate the percentage of the wood fiber that is replaced by a citrus or non-citrus fruit fiber substitute. Relevant properties would be understood to those of skill in the art, but generally include tensile properties such as porosity, tensile index, TEA, tensile stiffness, as well as physical properties, such as breaking length, tear index and resistance to bending.

In one embodiment, the blended fiber is about 1%, about 2%, about 3%, about 4%, about 5%, about 6%, about 7%, about 8%, about 9%, about 10%, about 11%, about 12%, about 13%, about 14%, about 15% or about 20%, about 25%, about 30%, about 35%, about 40%, about 45% or about 50% citrus or non-citrus fruit pulp.

Fibers ranging from about 10% to about 30% citrus fiber are provided herein. Specifically, citrus fiber is shown to provide adequate strength for the resulting paper (handsheet) when introduced at levels up to about 30% to about 50%. In a particular embodiment, the blended pulp contains less than about 30% citrus pulp.

Citrus fiber may be useful in a variety of paper bleached and unbleached applications including, for example, corrugated packaging, labels, cups, plates, and liquid packaging. In one embodiment, the principles described herein provide for wood-fiber reduced packaging paper. In some embodiments, a paperboard carton including fruit fiber, such as citrus fiber extracted from a citrus by-product stream, is provided. The paperboard carton may be a beverage carton, for example.

In another embodiment, non-citrus fruit fiber, treated as above, may be blended with wood fiber (e.g., softwood and hardwood/softwood blends) to create a blended pulp useful in paper, including but not limited to, packaging paper. In one embodiment, the blended pulp is about 1%, about 2%, about 3%, about 4%, about 5%, about 6%, about 7%, about 8%, about 9%, about 10%, about 11%, about 12%, about 13%, about 14%, about 15% or about 20%, about 25%, about 30%, about 35%, about 40%, about 45%, about 50%, about 60%, about 70%, about 80%, about 90%, about 95% or about 99% non-citrus fiber.

EXAMPLES

Example 1: Extraction

Dry citrus pellets were received from a citrus processing plant processing sweet oranges. Upon receipt, the pellets were tested for moisture content and stored in refrigerated storage held at 3° C. to 4° C. until use. One hundred kilograms of dry pellets (oven-dried basis) were introduced into 2500 kg of room temperature water. The mixture was agitated and heated by direct steam to 80° C. in a pilot-sized hydropulper. After achieving target temperature, the pH was reduced to 1.8 using sulfuric acid. The pH was tested every 10 minutes and adjusted with further acid if the pH was higher than the pH 1.8 target.

After 90 minutes at pH and temperature, the mixture was pumped to a second vessel and diluted to 2.25% solids with warm water; pH was adjusted to 4.0 using 50% sodium hydroxide and temperature maintained above 60° C. Approximately 800 ppm of DPTA of the original pellet weight was added to the mixture after dilution.

The mixture was pumped through a double-disk mechanical refiner set at 0.020" clearance and dewatered using a centrifugal decanter. The solids fraction was captured in screen carts for subsequent processing while the centrate was sewered.

Example 2: Bleaching Treatment

In exemplary embodiments, washed pulp from Example 1 was transferred to an indirectly heated, axial screw assisted up-flow tower where it was heated to and maintained at 60° C. With the addition of a 50% hydrogen peroxide solution, the $H_2O_2$ was applied at 6% (active on citrus dry solids) and the mixture diluted to result in 10% solids concentration and pH of 10.5-11.0 upon addition. The mixture was maintained at target temperature by indirect heating. After 60 minutes, the material was diluted to 5% solids, pumped to and treated as above, through the decanter.

Washed pulp was transferred to the same indirect-heated, axial bleaching tower. The pre-treated citrus pulp was heated to 60° C. A chlorine dioxide solution (at 10 g/liter) was added to achieve a 4% application rate having a final solids concentration of 10% (on dry pulp) and pH 3.6. After treatment for 1 hour, the pulp slurry was diluted to 5% solids and pumped to and treated as above, through the decanter.

Washed pulp was transferred to the same indirect-heated, axial bleaching tower as in the previous stage. The pre-treated citrus pulp was heated to 50° C. A 50% sodium hydroxide solution) was added to achieve a pH of 10.5, having a final solids concentration of 10% (on dry pulp). After treatment for 75 minutes, the pulp slurry was diluted to 5% solids and pumped to and treated as above, through the decanter.

Washed pulp was transferred to the same indirect-heated, axial bleaching tower as in the previous stage. The pre-treated citrus pulp was heated to 60° C. A chlorine dioxide solution (at 10 g/liter) was added to achieve a 2% application rate having a final solids concentration of 10% (on dry pulp). After treatment for 1 hour, the pulp slurry was diluted to 5% solids and pumped to and treated as above, through the decanter.

The pulp was stored at the decanter discharge solids in poly lined drums under refrigerated conditions.

Example 3: Sizing of Citrus Pulp

In some embodiments, various additives referred to as "sizes" are used in the formation of paperboard. Sizes assist in charge neutralization and help create resistance to liquid uptake or edge wicking. In some embodiments of processdes for the construction of paperboard, an internal rosin-alum size complex was used to resist the peroxide treatment and alkyl ketene dimer (AKD) surface size was used to assist in resisting the uptake of lactic acid. Internal size is typically added in the papermaking phase when fibers are pumped along freely in suspension. Surface size is typically added after the sheet has been made and mostly dried and applied on both sheet surfaces on a horizontal size press. A certain weight percentage uptake of each chemical (per ton) of final product is targeted and usually results in resisting both peroxide and lactic acid.

In exemplary embodiments, citrus pulp was removed from storage and diluted with room temperature water to 3% solids in an agitated tank. The pulp was sampled for streaming potential charge. Aluminum sulfate (alum) was added to the pulp at a rate of 65 lb./ton to neutralize the charge to about −0 mV. Drainage improvements upon alum neutralization were dramatic.

Example 4: Preparation of Blended Pulp

Commercially manufactured bleached wood pulp including softwood and hardwood pulp blended at a 70:30 ratio, respectively, was mixed with room temperature water at 3% consistency. After refining the blend to 470 Canadian Standard Freeness (CSF) units the wood pulp was held until blended with the citrus pulp at a 90:10 ratio, respectively.

Samples of both the wood pulp and citrus pulp prepared in Example 3 were blended at appropriate ratios. The freeness of the blend was tested and determined to decrease to 450 CSF, confirming the impact of neutralizing the citrus pulp with a de minimis decrease in freeness from a 470 units starting point. Several 20 liter samples of both pulps were taken of these pulps and the samples.

Example 5: Production of Paper

The blended pulp from Example 4 was pumped to the headbox of a pilot paper machine. The pulp was drained, pressed and dried on the pilot machine at 310 grams/sq. meter.

Characteristics of the above pulps and paperboard are described in U.S. patent application Ser. Nos. 13/865,925, 13/865,933, 14/518,936, and 14/518,950, each of which is incorporated by referenced herein in its entirety. Citrus pulp blends having a percentage of citrus pulp in the blend in the range from about 10% to about 30% exhibited acceptable properties of breaking length, tear index, and resistance to bending.

Example 6: Edge Wicking in Paperboard Comprising Citrus Pulp

Paperboard comprising citrus fiber as described herein was evaluated for the ability of the cut edge of the board to uptake liquid ("edge wicking"). Two edge wicking tests were used for evaluation of aseptic paperboard grades. First, edge wicking performance was evaluated in 35% peroxide at 60° C. Second, edge wicking performance of 1% lactic acid solution at room temperature was evaluated. Edge wicking performance tests were conducted by thermally laminating test sheets and exposing a specific perimeter edge to the solutions. The weight of the laminated samples before and after exposure for a specified time is indicative of the uptake or wicking potential for the paperboard. Weights were corrected for the paperboard caliper. Uptake targets and upper reject limits for each test were established based on requirements for particular paperboard applications.

In one trial, paperboard made with citrus pulp failed both the peroxide and lactic acid wicking tests, exhibiting wicking 5-10 times above the allowable intake. Control paperboard not comprising citrus pulp met requirements for both edge wicking tests.

In another trial, paperboard made with 20% citrus pulp exhibited wicking values of 10-20 times acceptable limits when evaluated in 1% lactic acid solution.

In a further trial, different amounts of sizing chemicals were employed in producing paperboard comprising citrus pulp. However, paperboard comprising citrus pulp continued to fail edge wicking performance tests.

Example 7: Sizing and Edge Wicking Performance

The effect of sizing on edge wicking performance was evaluated as follows.

The effect of adding alum at different stages during preparation of pulp or paper was evaluated to determine whether the relatively high surface area of the citrus pulp may be consuming the majority of the size and not allowing adequate distribution of size on the sheet. However, tests of paperboard sheets processed with alum added at different stages indicated that the timing of alum addition did not change the sizing development on the sheets.

Further testing was conducted to determine whether standard amounts of rosin were insufficient to cover the higher surface area of citrus pulp to allow sizing to develop. Citrus pulp has a molecular surface area 2-3 times higher than conventional wood pulps. In these tests, without the use of a washing aid, the amount of rosin did not improve the sizing response.

Paperboard was also tested to determine whether the high negative charge of the C-pulp consumes all of the alum used in standard processing methods. However, results of these tests indicated that the use of alum or diallyl dimethyl ammonium chloride (DADMAC) as ion scavengers did not affect the edge wicking performance of processed paperboard.

Example 8: Oils and Edge Wicking Performance

Citrus pulp-containing paperboard was subjected to several further tests to assess the development of edge wicking performance. In one of these tests, paperboard was submerged for one second in an acetone bath. It was found that the edge wicking performance of paperboard sheets improved dramatically after being submerged in the acetone.

It was hypothesized that acetone dip performance resulted from surface-active impurities present in citrus pulp, which undermine the sizing chemistry by lowering surface tension. These materials could be oils (neutrals), fatty acids, or other aliphatic moieties that lower the surface energy of the pulp and accelerate wetting (edge wicking).

Example 9: Improved Edge Wicking Performance Using Washing Aids

In order to determine whether citrus pulp-containing paperboard contained mobile surface-active impurities, agents capable of attracting or sequestering the impurities from the pulp and into the aqueous phase were investigated.

Figure 6:
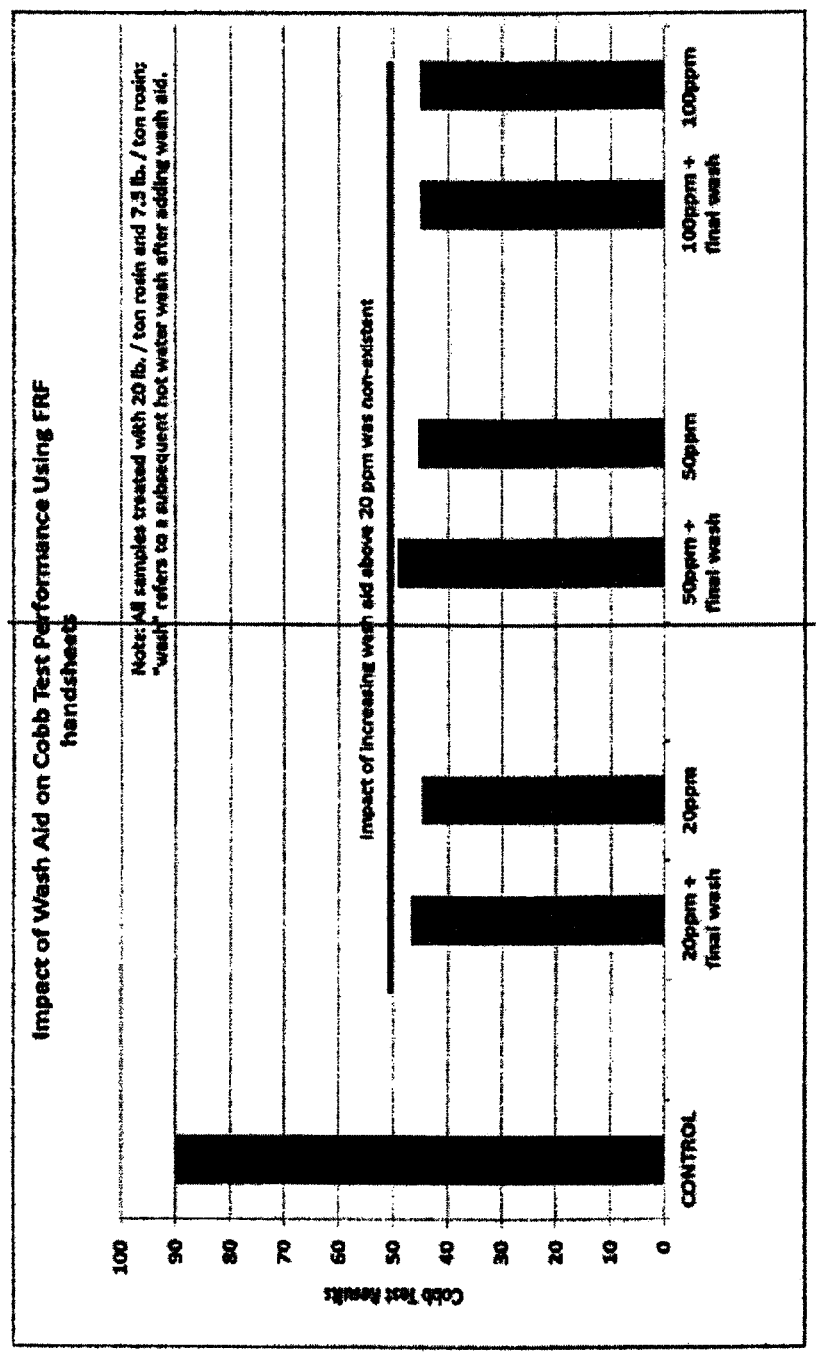
FIG. 6 shows the Cobb test performance of paperboard handsheets comprising citrus pulp.

A bio-refining washing aid, Ashland DPI 461, was evaluated to establish its efficacy in reducing edge wicking potential using a modified size test (Cobb test). At small doses (ppm range), a dramatic improvement in wicking resistance and results was observed. FIG. 6 shows the Cobb test performance of paperboard handsheets comprising citrus pulp treated with 20 lb/ton and 7.5 lb/ton rosin with a subsequent hot water bath after adding a washing aid (Ashland DPI 461) at 20 ppm, 50 ppm, or 100 ppm. These results showed that paperboard containing pulp and treated with washing aid at 20 ppm achieved Cobb values comparable to samples not containing pulp. Further, levels of washing aid above 20 ppm does not significantly improve Cobb values.

Figure 7:
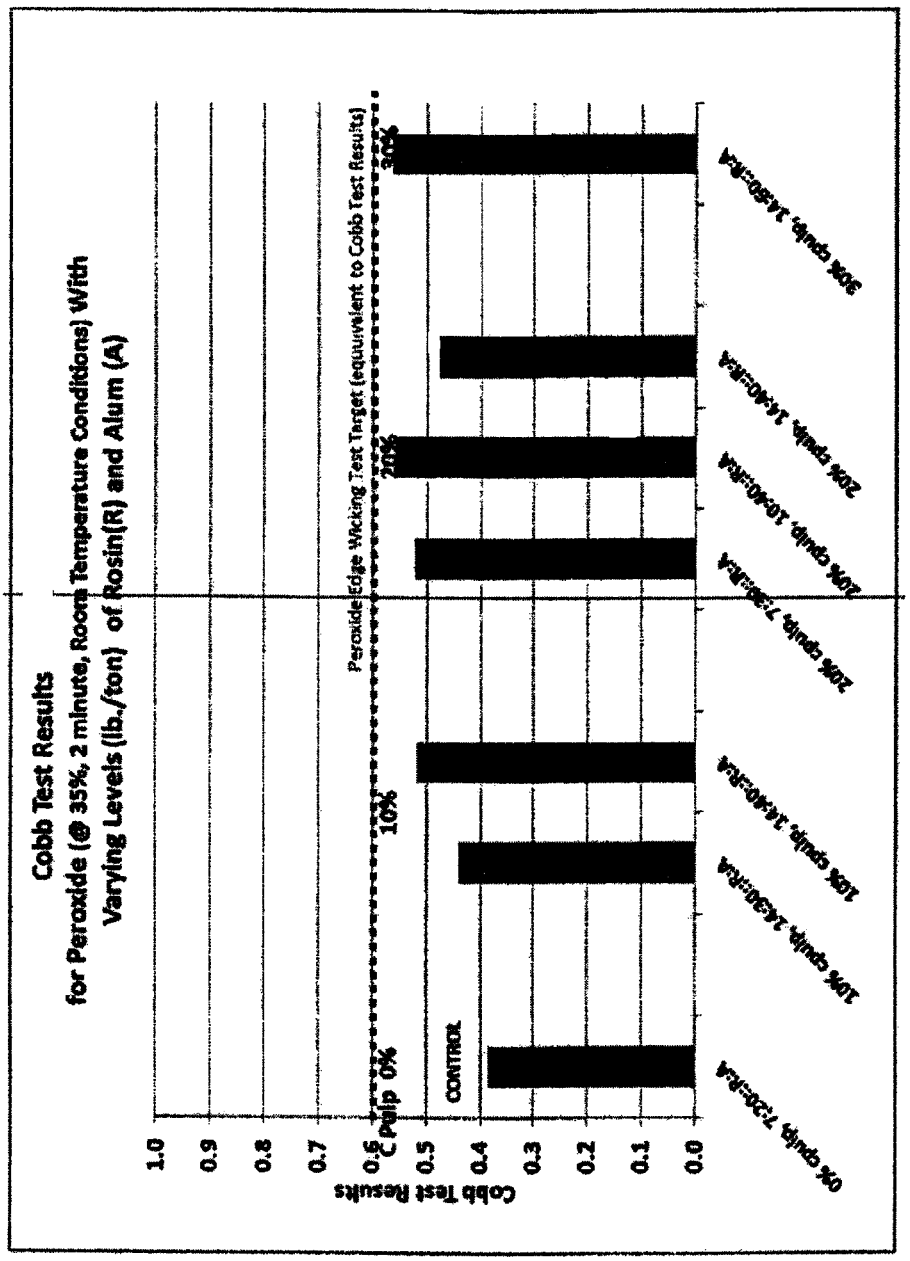
FIG. 7 shows the Cobb test performance of paperboard handsheets processed using a washing aid.

Another trial was conducted using previously manufactured citrus pulp, which was resuspended in hot water (55° C.) at pH 9.5 with the addition of 20 ppm of Ashland DPI-461 washing aid. FIG. 7 shows the Cobb test performance of these samples when exposed to 35% peroxide for two minutes at room temperature. The samples were processed with varying amounts of rosin and alum as indicated in the figure.

Based on these results, the wash aid, Ashland DPI-461, proved to be effective in sequestering the surface active components over a range of application rates, pH's and temperatures to enable citrus pulps to achieve near normal sizing results. By sequestering the surface active agents, this neutral detergent or surfactant was found effective in attracting and permanently removing, by one or several subsequent washing steps, the surface active components responsible for undermining wicking resistance.

As various modifications could be made in the constructions and methods herein described and illustrated without departing from the scope of the invention, it is intended that all matter contained in the foregoing description or shown in the accompanying drawings shall be interpreted as illustrative rather than limiting. The breadth and scope of the present invention should not be limited by any of the above-described exemplary embodiments, but should be defined only in accordance with the following claims appended hereto and their equivalents. All patent and non-patent documents cited in this specification are incorporated herein by reference in their entireties.

The invention claimed is:

1. A paperboard material, comprising:
   a first fiber derived from a wood source; and
   a second fiber derived from a fruit source, the second fiber being substantially free of surface active components,
   wherein the paperboard material has reduced edge wicking properties relative to a paperboard material comprising a second fiber that is not being substantially free of surface active components.

2. The paperboard material of claim 1, wherein the paperboard material absorbs water at a Cobb test rate of less than about 60 g/m$^2$.

3. The paperboard material of claim 1, wherein the first fiber is selected from the group consisting of: a hardwood fiber, a softwood fiber, and combinations thereof.

4. The paperboard material of claim 1, wherein the second fiber is a citrus fiber.

5. The paperboard material of claim 4, wherein the citrus fiber is an orange, sweet orange, clementine, kumquat, lime, leeche lime, satsuma, mandarin, tangerine, citron, pomelo, lemon, rough lemon, grapefruit, tangerine, or tangelo fiber.

6. The paperboard material of claim 4, wherein the citrus fiber is derived from the group consisting of: albedo, endocarp, pulp, and combinations thereof.

7. The paperboard material of claim 4, wherein the material comprises at least 20% of the second fiber.

8. The paperboard material of claim 7, wherein the material comprises at least 30% of the second fiber.

9. The paperboard material of claim 1, wherein the surface active components include oils, fatty acids, or other aliphatic and aromatic moieties.

* * * * *